May 27, 1958  K. S. WOOD ET AL  2,836,021
APPARATUS FOR CUTTING AND SHREDDING MATERIALS
Filed March 16, 1955  2 Sheets-Sheet 1
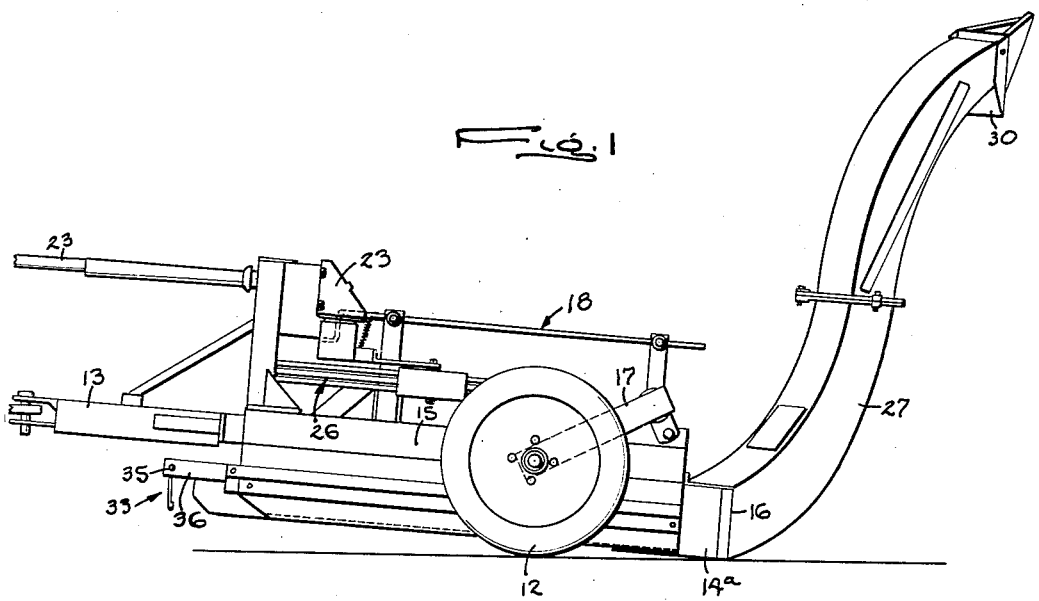
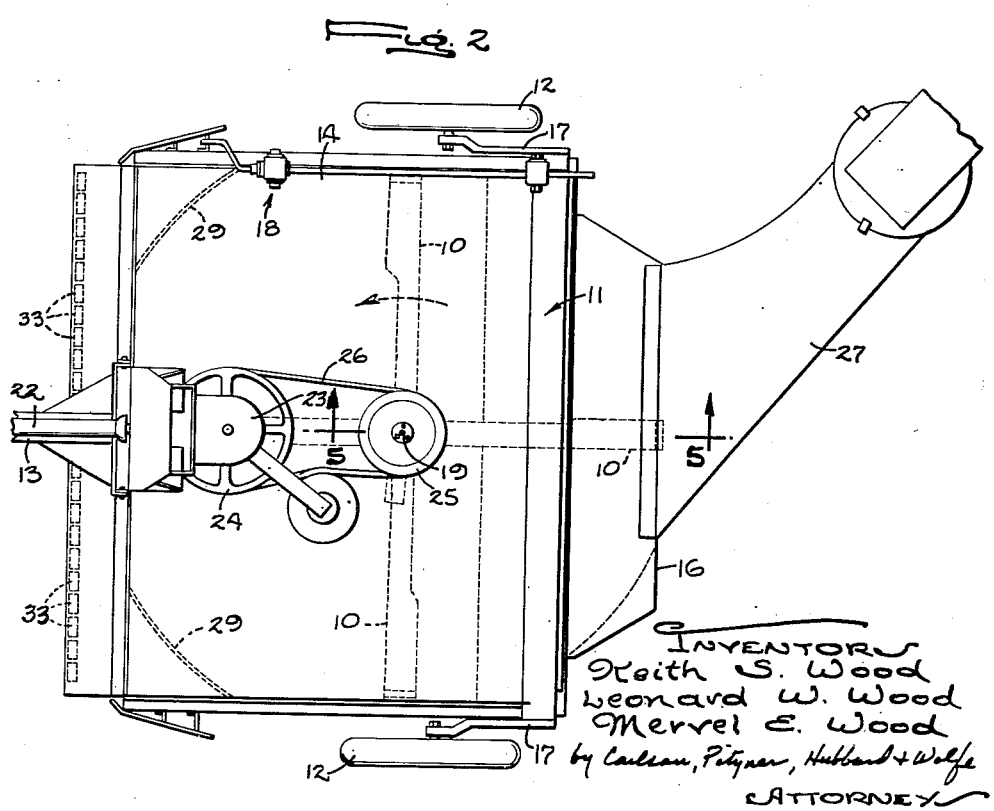
INVENTORS
Keith S. Wood
Leonard W. Wood
Mervel E. Wood
by Carlson, Pitzner, Hubbard + Wolfe
ATTORNEYS

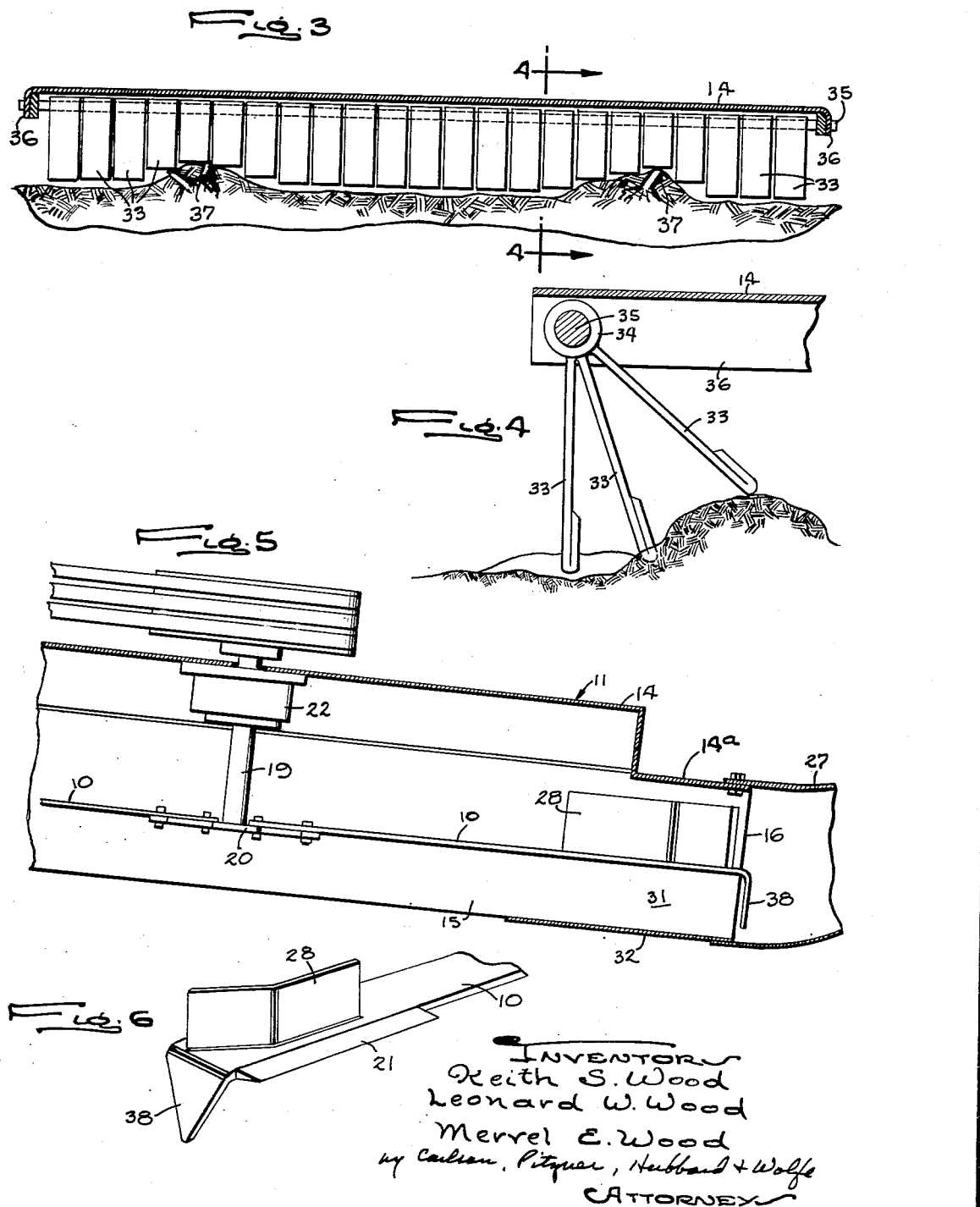

United States Patent Office 2,836,021
Patented May 27, 1958

2,836,021

APPARATUS FOR CUTTING AND SHREDDING MATERIALS

Keith S. Wood, Leonard W. Wood, and Mervel E. Wood, Oregon, Ill., assignors to Wood Brothers Manufacturing Company, Oregon, Ill., a corporation of Illinois Application March 16, 1955, Serial No. 494,716

3 Claims. (Cl. 55—62)

This invention relates to a cutter which cuts and shreds material and, more particularly, to a cutter in which generally horizontally disposed blades turn within a housing which is pulled along the ground. In some instances, such a cutter is provided with a blower which may be in the form of vanes secured to the blades and which hold the cut material in the plane of the blades to shred the material and then blow the latter out of the housing through an outlet in the latter.

The general object of the invention is to provide a new and improved cutter of the above character which, as compared to prior arrangements, produces a more effective blowing action.

A more detailed object is to provide the cutter with a novel means for insuring that all of the material cut by the blades is directed into and blown out through the outlet in the housing.

Another object is to provide the cutter with a novel front wall which effectively closes the housing for the blowing action but which, at the same time, permits the material being cut to enter the housing as the cutter moves along the ground.

Other objects and advantages of the invention will become apparent from the following detailed description taken in connection with the accompanying drawings, in which—

Figure 1 is a side elevation of a cutter embodying the novel features of the present invention.

Fig. 2 is a fragmentary top view.

Fig. 3 is an enlarged fragmentary front elevation of the cutter.

Fig. 4 is an enlarged fragmentary sectional view taken along the line 4—4 in Fig. 3.

Fig. 5 is an enlarged fragmentary sectional view taken along the line 5—5 in Fig. 2.

Fig. 6 is a fragmentary perspective view of a blade.

For purposes of illustration, the invention is shown in the drawings embodied in a cutter comprising one or more rotary blades 10 mounted within a generally horizontal box-like housing 11 which is supported adjacent its rear end by wheels 12 and is connected at its forward end to a draft vehicle, such as a tractor (not shown), by means of drawbars 13. The housing is formed by a generally square top wall 14, spaced side walls 15 depending from the edges of the top wall and a rear wall 16 (Fig. 5) attached to a rearward extension 14a of the top wall. The wheels 12 are journaled on arms 17 which are pivotally supported at one end on the upper side of the housing 11 to swing about a horizontal axis. Through a suitable adjusting mechanism 18, the arms may be swung about this axis to raise or lower the wheels relative to the housing thereby to change the position of the blades 10 with respect to the ground.

Herein, there are four blades 10 angularly spaced around and radiating from a generally upright shaft 19 (Fig. 5). The blades are flat bars and are secured to a plate 20 fast on the lower end of the shaft. Adjacent its outer end, each blade is formed with a sharpened portion 21 (Fig. 6) on the leading edge to form the cutting edge of the blade. The shaft 19 is journaled in a bearing 22 on the top wall 14 and is turned from the power take-off of the tractor through a shaft 23 (Figs. 1 and 2), a gear box 23, sheaves 24 and 25 and a belt drive 26, the sheave 25 being secured to the upper end of the shaft 19.

In some instances, it is desirable to collect the material cut by the blades 10 in a wagon or the like trailing behind the cutter. For this purpose, the cutter is provided with means for blowing the cut material out of the housing 11 and into a conduit 27 which guides the material to the wagon. This means also serves to hold the material in the plane of the blades long enough that it is shredded. Herein, the blowing means is in the form of vanes 28 (Figs. 5 and 6) rigid with and upstanding from the blades 10 adjacent the outer ends thereof. The vanes are comparatively short in length and their outer end portions are bent back relative to the direction of rotation (indicated by the arrow in Fig. 2). The vanes operate in a manner similar to that of the vanes of a conventional centrifugal fan or blower. Curved plates 29 (Fig. 2) may be disposed across the corners of the housing so that the inside of the latter is generally circular to conform to the path of the blades.

The material cut by the blades 10 is blown out of the housing 11 by the vanes 28 through an outlet opening in the rear wall 16 and into the conduit 27. The latter is disposed generally tangentially with respect to the path of rotation of the blades and extends outwardly and upwardly away from the housing. At its upper end, the conduit terminates in a spout 30 which guides the material down to flow into the wagon or other receiving means.

To increase the effectiveness of the blowing action and guide the material into the conduit 27, the bottom of the housing 11 is closed adjacent the rear thereof to form a chamber 31 (Fig. 5) into which the material is blown before it leaves the housing. This is achieved by welding a plate 32 to the underside of the housing. The plate spans the side walls 15 and extends from the back wall 16 forwardly toward the center of the housing. Thus, the plate constitutes a fragmentary bottom wall. As shown in Fig. 5, the blades 10 as they rotate pass through the chamber 31 which guides the material toward the outlet in the rear wall.

The plate 32 serves the additional function of protecting the blades 10. When the cutter is drawn over a rise in the ground, the plate acts as a skid and slides over the rise thus preventing the blades from digging into the ground.

The effectiveness of the blowing action is increased further through the provision of a novel means for closing the front of the housing 11 while, at the same time, permitting the material to be cut to enter the housing as the cutter is pulled along the ground. This means comprises a plurality of elements 33 (Fig. 3) disposed side by side across the front of the housing and normally constituting, in effect, a front wall. Each element is independently movable to an inactive position and is moved to this position by the material to be cut as the latter enters the housing.

In the present instance, the elements 33 are in the form of narrow plates secured at their upper ends to collars 34 (Fig. 4) which are journaled on a horizontal rod 35 spanning and fixed to downturned flanges 36 on the sides of the top wall 14. The rod is disposed immediately beneath the top wall adjacent the front end thereof and, through the medium of the collars 34, the plates 33 hang from the rod to swing freely and independently about the axis defined by the rod. Normally, the plates hang down in a vertical position and form a wall which holds the cut material in the housing, that is, they prevent the material from being blown out the front of the housing. When the material to be cut, such as the stalks 37 (Fig. 3) is encountered by a plate, it swings the latter back as shown in Fig. 4 until it is within the housing. The plate then swings back to the vertical position again closing the housing front.

In order that the cutter be effective to cut, shred and blow materials which lie on the ground, such as vines and bent over stalks, each blade 10 is formed with a part 38 which projects downwardly and cuts such material so that the latter then may be drawn up into the blades and shredded. Each part 38 may, as illustrated in Fig. 6, be formed by bending down the tip of the blade 10 and by pointing this tip.

It will be observed that, with the present invention, an effective blowing action is obtained so that substantially all of the material cut is shredded by the blades 10 and blown out of the housing 11 and into the conduit 27.

We claim as our invention:

1. A cutter having, in combination, a generally horizontal housing having a top wall and side and rear walls depending from said top wall, a partial bottom wall spanning said side walls and extending forwardly from said rear wall toward but short of the center of said housing, said bottom wall cooperating with the other walls to define a chamber across the rear of said housing, an elongated blade disposed in a plane parallel to to and between said top and bottom walls and mounted to turn about an axis normal to said plane, and in front of said bottom wall, said blade as it turns projecting into said chamber, a vane secured to the top of said blade near the outer end thereof to turn with the blade and operable to blow the material cut by the blade tangentially into said chamber, and a conduit opening into said chamber and extending outwardly from said housing to define an outlet passage through which the material is blown upon leaving the chamber.

2. A cutter comprising a generally horizontal housing having a top wall and side and rear walls depending from said top wall, an elongated cutter blade mounted within said housing to turn about a generally vertical axis and projecting radially outwardly from said axis, means defining an outlet opening through one of said walls, a vane secured to the top of said blade to turn therewith and operable to blow material cut by said blade out of said housing through said outlet, and a plurality of generally flat narrow elements disposed side by side across the front of said housing to form a front well therefor, said elements being normally disposed in upright positions and suspended at one end from said top wall to hang down and thereby close the front of said housing while being independently swingable away from said upright positions to permit material to enter the housing through the front thereof.

3. A cutter as defined in claim 2 in which said elements are formed as separate plates pivotally suspended at said one end from said top wall and individually swingable into and out of said upright positions about the pivotal axis.

References Cited in the file of this patent

UNITED STATES PATENTS

| | | |
|---|---|---|
| 1,899,564 | Frey | Feb. 28, 1933 |
| 2,590,734 | Strong | Mar. 25, 1952 |
| 2,661,493 | Joy | Dec. 8, 1953 |
| 2,701,942 | Caldwell et al. | Feb. 15, 1955 |
| 2,706,441 | Caldwell et al | Apr. 19, 1955 |
| 2,720,070 | Arrington | Oct. 11, 1955 |